United States Patent [19]

Tackett et al.

[11] Patent Number: 5,097,522
[45] Date of Patent: Mar. 17, 1992

[54] OPTICAL FIBER TERMINAL AND TERMINATION METHOD

[75] Inventors: Timothy N. Tackett, Warren; Kurt L. Jennings, Niles, both of Ohio

[73] Assignee: General Motors Corporation, Detroit, Mich.

[21] Appl. No.: 611,253

[22] Filed: Nov. 9, 1990

[51] Int. Cl.$^5$ .......................... G02B 6/00; G02B 6/36
[52] U.S. Cl. ............................................................ 385/53
[58] Field of Search ................. 350/96.10, 96.20–96.23

[56] References Cited

U.S. PATENT DOCUMENTS

| | | | |
|---|---|---|---|
| 4,191,447 | 3/1980 | Borsuk | 350/96.20 |
| 4,763,980 | 8/1988 | Gerber et al. | 350/96.20 |
| 4,822,129 | 4/1989 | Webb | 350/96.20 X |
| 4,854,663 | 8/1989 | Borsuk et al. | 350/96.20 |

Primary Examiner—Akm Ullah
Attorney, Agent, or Firm—Francis J. Fodale

[57] ABSTRACT

A fiber optic connector comprises a fiber having a planar end surface formed by hot plate melting. A terminal fitting surrounds the fiber and has a terminal face coplanar with the fiber end surface. A reservoir groove is formed in the terminal face surrounding the aperture and is isolated therefrom by a portion of the terminal face. The groove is preferably dimensioned to completely receive subsurface the excess reflowed fiber material resulting from the hot plate melting. In a preferred embodiment, the exit aperture is circular and the groove has a coaxial inner diameter only sufficiently larger than the aperture diameter to assure isolation of the groove from the aperture.

17 Claims, 1 Drawing Sheet

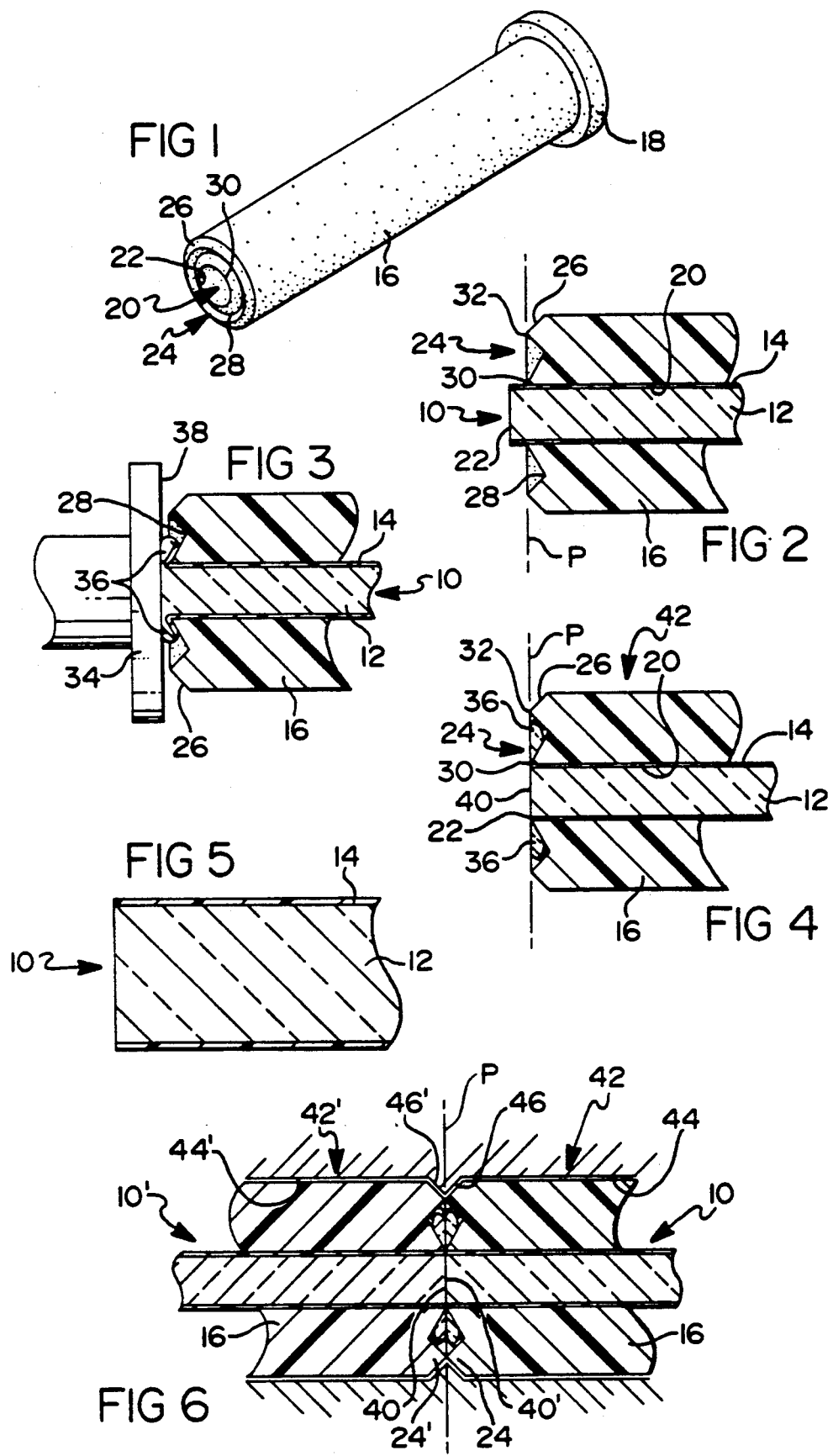

OPTICAL FIBER TERMINAL AND TERMINATION METHOD

BACKGROUND OF THE INVENTION

This invention relates generally to fiber optic connectors and, more specifically, to fiber optic connectors in which a plastic fiber end is formed by a melting process.

Plastic optical fibers used for data transmission are most often supplied in cable form in which the cable comprises a glass or plastic fiber core, a thin cladding, and a protective jacket which can include strengthening members. Connecting the fiber optic cable to another device, such as an electro-optic device or another cable, can be accomplished by two methods.

In one, bare fiber ends are contacted without any added terminal. This is a very delicate connection and is subject to damage of the connection, with attendant signal degradation across the interface.

The other method provides a terminal on the fiber end. This arrangement is very durable and provides a more reliable connection in systems requiring quick connect/disconnect with devices or other cables. The termination of the cable is often performed as a field operation, such as when installing data transmission systems, such as computer LANs (Local Area Networks).

To provide an optically efficient interface between an optical fiber and another device, it is necessary to mount the fiber end in a suitable terminal fitting in a manner that will provide good signal transmission across the interface. This requires that the fitting properly align the fiber with the terminal of other device. Such alignment is provided by mating surfaces formed on the fittings for the fiber and the device, which interfit to assure alignment.

An optically efficient interface also requires that the fiber have a flat, smooth end surface. Two methods of forming this end surface on plastic optic fibers during termination are in general usage. In both, the fiber end is exposed and a terminal is clamped or crimped onto the cable jacket, or the bare fiber is epoxied or otherwise cemented onto the terminal. The terminal can be a ferrule or a multiple fiber or combined fiber and electrical connector.

In one, the "polishing" method, the fiber end is snipped off to form a generally flat surface near the terminal face of the end fitting. This surface is then polished to a predetermined degree of smoothness to eliminate pits which adversely affect light transmission. This polishing method is a laborious, exacting and, thus costly, process which requires repeated visual inspection to determine when the predetermined degree of smoothness is achieved.

The second "hot plate" method involves stripping the cable jacket, inserting the fiber into an end fitting and projecting it through the exit aperture beyond the terminal face of the fitting. The fiber end is then snipped off a predetermined short distance beyond the terminal face, a smooth plate is brought into contact with the fiber end, heat is applied to the plate to melt the fiber, the heat is removed from the plate, the fiber cools and solidifies, and the plate is removed. This "hot plate" method leaves the fiber end with the same smooth, flat surface as the plate.

One problem with the hot plate method is disposal of the excess reflowed fiber material, which remains after melting, in a manner that does not adversely affect light transmission through the terminal. Several methods are in current usage. In one, the excess reflowed material resulting from the melting is formed into a smooth-surfaced "pancake" lying atop the fitting's terminal face. While this provides the requisite smooth, flat surface, this pancake protrudes from the surface and is unbounded, which allows light leakage and degrades light transmission to an unacceptable degree.

Another problem is caused by the thickness of this pancake. Since it is uncontrolled, it prevents precise mating of the terminal with the other device. This affects alignment of the fiber with the other device and light transmission across the interface.

A further problem is contamination of the fiber material by the cladding material, caused by their intermixing during melting. This further degrades light transmission.

Two design modifications of the end fitting have been made in an effort to overcome the problems caused by the protruding, unbounded pancake. In one, the thickness of the pancake is reduced by flaring the exit aperture with a conical countersink. If the excess reflowed material exceeds the capacity of this slight enlargement, a protruding pancake is formed, with the same problems just described.

If melting produces insufficient excess reflowed material to completely fill the flared enlargement, the hot plate will make incomplete contact and form a pitted fiber end surface, resulting in seriously degraded light transmission. In either event, the cladding material will again contaminate the core material during melting, with the resulting adverse consequences noted above.

In the other modification, the protruding pancake is eliminated by moving it subsurface. The exit aperture is countersunk to form an enlarged cylindrical recess in the fitting terminal face. Upon melting, the pancake is formed completely within the recess. A smooth surface may be formed by the hot plate, regardless of the quantity of the excess reflowed material. The mating and alignment problems caused by the protruding pancake lying atop the terminal face of the fitting are eliminated.

However, a shortage of material (i.e. insufficient to fill the recess) will result in an irregular boundary, resulting in signal degradation. Although the enlarged recess prevents formation of a protrusion, it still can cause light leakage due to the lack of a defined boundary if the reflowed plastic material does not reach the recess walls.

The hot plate melting results in a gap between the melted fiber end surface (top of the pancake) and the point of fiber entrance to the recess if the recess is not exactly filled, which it never is. In order to guarantee that the pancake does not protrude above the terminal face, this recess must be sufficiently voluminous to accommodate the largest quantity of excess reflowed material that could occur. Thus the gap is inevitable. In any event the ideal light guiding properties of the fiber are lost at the entrance to the recess where the irregular pancake of melted material begins.

When the fitting is mated with the other device, the gap introduces a new source of light leakage and signal degradation. Also, the problem of contamination by the intermixed cladding material persists.

All of the currently-used methods and apparatus for terminating an optical fiber have inherent physical problems that require extremely tight processing tolerances to minimize degradation of light transmission across the terminal interface in a connection. A slight variance of excess melted fiber material will cause light leakage that results in signal degradation and consequent inferior light transmission at the terminal interface.

Thus, a need exists for an optical fiber termination method and apparatus which eliminates the problems causing light leakage and resultant signal degradation.

SUMMARY OF THE INVENTION

It is an object of this invention to provide an optical fiber termination method and apparatus which eliminates the problems causing light leakage and resultant signal degradation.

It is another object of this invention to provide an improved terminal fitting for the end of an optical fiber that eliminates the causes of light leakage characteristic of currently-used fittings.

It is a further object of this invention to provide an improved fiber optic terminal featuring reduced light leakage resulting from the use of a terminal fitting that enables hot plate melting to provide a fiber end surface coplanar with the fitting end face.

It is a yet further feature of this invention to provide an improved fiber optic terminal which permits relaxation of processing tolerances, while providing optimum light coupling and transmission properties.

In accordance with one aspect, this invention features a fitting for the end of a light-transmitting fiber, comprising a body, a cavity in the body for receiving a fiber, and a planar terminal face formed on the end of the body and containing an exit aperture for the fiber. A reservoir groove is formed in the terminal face surrounding the exit aperture for receiving the excess reflowed material resulting from melting of the fiber to reform a smooth end face. The groove is spaced from the exit aperture by a portion of the terminal face. The groove is dimensioned to completely receive subsurface the excess reflowed fiber material resulting from the hot plate melting.

In another aspect, this invention features a fiber optic connector comprising a fiber having a planar end surface formed by hot plate melting, a terminal fitting surrounding the fiber and having a terminal face coplanar with the fiber end surface, and a reservoir groove formed in the terminal face surrounding the aperture and being isolated therefrom by a portion of the terminal face. The groove is preferably dimensioned to completely receive subsurface the excess reflowed fiber material resulting from the hot plate melting. In a preferred embodiment, the exit aperture is circular and the groove has a coaxial inner diameter only sufficiently larger than the aperture diameter to assure isolation of the groove from the aperture.

In a further aspect, this invention features a method of forming a fiber optic terminal, comprising forming an end fitting having a planar terminal face, forming a through bore in the fitting terminating in an exit aperture in the terminal face, and forming a reservoir groove in the terminal face surrounding the exit aperture and isolated therefrom. The method further comprises the steps of inserting the fiber through the bore and beyond the terminal face, and melting the fiber and forming it coplanarly with the terminal face, with the excess reflowed fiber material received within the groove completely below the terminal face.

In all aspects, this invention eliminates light loss due to unbounded protrusions extending above the fitting terminal face, by subsurface gaps, by misalignment, and by contamination of the fiber core material by cladding material.

These and further features of this invention will become more readily apparent upon reference to the following detailed description and the annexed drawings, in which:

BRIEF DRAWING DESCRIPTION

FIG. 1 is a perspective view of a terminal fitting used in forming a fiber optic terminal in accordance with this invention;

FIG. 2 is a partial longitudinal sectional view illustrating a fiber inserted through the fitting shown in FIG. 1.

FIG. 3 is a view similar to FIG. 2, illustrating the melting of the fiber end during the formation of the fiber optic terminal of this invention;

FIG. 4 is a view similar to FIG. 3, illustrating the terminal after formation;

FIG. 5, is an enlarged detail sectional view of the optic fiber terminated in accordance with this invention; and FIG. 6 is a longitudinal sectional view of the interface of two fiber optic terminals formed in accordance with this invention.

DETAILED DESCRIPTION OF A PREFERRED EMBODIMENT OF THE INVENTION

Referring now to FIG. 5 of the drawings, a plastic optical fiber 10 comprises a core 12 of an optical plastic, such as polymethylmethacrylate, and a cladding 14 of a suitable material, such as a fluoropolymer. The fiber core 12 may be of any diameter which suits a particular application. As an example, the fiber core 12 is illustrated as being on the order of 1 mm, while the cladding thickness is on the order of 20 microns.

Both core and cladding are conventionally part of a fiber optic cable (not shown) that includes one or more fibers encased in a protective jacket (not shown), which is conventionally stripped for cable termination. Fiber optic cables of this type are useful for data transmission and must be terminated for connection to other cables or to electro-optical devices.

FIG. 1 shows an elongated fitting, or ferrule, 16 having a base flange 18 and a longitudinal bore 20 for receiving fiber 10. Ferrule is preferably made of Hytrel ® or other polyester copolymer. Bore 20 terminates in an exit aperture 22 formed in the terminal face 24 of ferrule 16. Terminal face 24 is bounded by a peripheral chamfer 26 and includes an annular groove 28 intermediate exit aperture 22 and chamfer 26.

As illustrated in FIG. 2, the axially outermost portions of terminal face 24, which separates exit aperture 22 from groove 28 and groove 28 from chamfer 26, lie in a plane denoted "P". In this manner, groove 28 is isolated from exit aperture 22 by a land, or ring, 30, and from chamfer 26 by a coplanar land 32.

Formation of the terminal will now be described, with reference to FIGS. 1, 2, 3 and 4. As shown in FIG. 2, fiber 10 is projected through bore 20 and out exit aperture 22, where it is snipped off a predetermined distance beyond terminal face 24. This distance should be sufficient to assure that a solid, or complete, cross-section of core material 12 extends beyond terminal face 24.

In addition, this distance must be such as to assure that the volume of fiber material (including both core and cladding material) is less than the volume of groove 28 lying below plane "P" of terminal face 24 (i.e. the subsurface volume of groove 28). In practice the "predetermined" distance will be a range of distances dependent on the tooling or fixturing and tolerances utilized in a particular field termination procedure. In any event, the groove subsurface volume always exceeds the projecting fiber volume.

As illustrated in FIG. 3, a conventional "hot plate" 34 is contacted with the end of fiber 10 which begins to melt. Plate 34 has a flat, smooth surface 38 and is heated to a temperature that is high enough to melt fiber 10, but is lower than the melting temperature of ferrule 16. The hot plate 34 advances as the fiber end begins to melt.

This process continues (actually a very short time) until hot plate 34 engages the terminal face rings 30 and 32. At this time, plate 34 is cooled, allowing the end of fiber 10 to solidify. Then plate 34 is removed, leaving the fiber with a flat, smooth surface 40 imparted by plate surface 38. As shown in FIG. 4, fiber end surface 40 lies in plane "P", coplanar with terminal face rings 30 and 32.

During this process, the excess reflowed fiber material, indicated at 36, is forced radially outwardly and into groove 28, as shown. This assures that the cladding material does not contaminate the flat, smooth end surface 40 of fiber core material, which is the same diameter as fiber 10 and is coplanar with ferrule terminal face 24.

Because the plate 34 engages both rings 30 and 32 and because the rings are coplanar, all of the excess reflowed fiber material 36 is forced to flow into groove 28, subsurface of the terminal face plane "P", where it is trapped. Thus, as mentioned above, it is critical that the subsurface volume of groove 28 exceed the volume of excess reflowed fiber material 36.

The width of rings 30 and 32 need be only sufficient to assure isolation of groove 28 from exit aperture 22 and chamfer 26 and to enable replication of this relationship during mass production of the ferrules. Ideally, the ring 30 between the groove and exit aperture should be as narrow as possible to facilitate the flow of excess fiber material into the groove.

This relationship assures isolation of material 36 from fiber end surface 40, preventing pits, pancakes or contamination by cladding material. Also, by forcing all the excess material 36 into groove 28, none of it can spill out onto chamfer 26 and alter its profile.

FIG. 6 illustrates the coupling of a pair of like terminals 42, 42' formed in accordance with this invention. Terminals 42, 42' are oppositely inserted through a receptacle bore 44 into flush engagement of their terminal faces 24, 24'. Alignment of the respective fibers 10, 10' is maintained by the engagement of terminal chamfers 26, 26' with respective mating surfaces 46, 46' formed centrally of bore 44. Such flush engagement and axial alignment are a result of the provision of the flush fiber ends 4 and the uncontaminated terminal chamfer 26.

By utilizing ferrule 16 to form a terminal 42 by the disclosed process, this invention provides an inexpensive fiber optic terminal virtually free of the contamination, light loss or misalignment problems experienced with prior terminals.

While only a preferred embodiment has been disclosed and described, obvious modifications are contemplated within the scope of this invention and the following claims.

We claim:

1. A terminal fitting for the end of a light-transmitting fiber, comprising
    an elongated body,
    a bore extending through the body and having an exit aperture for receiving a fiber therethrough,
    a planar terminal face formed on the end of the body containing the exit aperture, and
    a reservoir groove formed in the terminal face surrounding the exit aperture, the groove being spaced from the exit aperture by a portion of the terminal face.

2. The terminal fitting of claim wherein the groove has a volume sufficient to receive completely subsurface the excess reflowed fiber material resulting from melting and forming a fiber end surface coplanar with the terminal face.

3. The terminal fitting of claim 2, wherein the groove is circular and coaxial with the exit aperture.

4. The terminal fitting of claim 3, wherein the groove has a V-shaped cross-section.

5. The terminal fitting of claim 1, wherein the exit aperture is circular and the groove has a coaxial inner diameter only sufficiently larger than the aperture diameter to assure isolation of the groove from the aperture.

6. A fiber optic connector comprising a fiber having a planar end surface formed by hot plate melting, a terminal fitting surrounding the fiber and having a terminal face coplanar with the fiber end surface, and a reservoir groove formed in the terminal face surrounding the aperture and being isolated therefrom by a portion of the terminal face.

7. The connector of claim 6, wherein the groove is dimensioned to completely receive subsurface the excess reflowed fiber material resulting from the hot plate melting.

8. The connector of claim 7, wherein the groove is circular and coaxial with the exit aperture.

9. The connector of claim 8, wherein the groove has a V-shaped cross-section.

10. The connector of claim 8, wherein the body has an annular chamfer formed adjacent the groove about the periphery of the terminal face to enhance alignment of the fiber with a device to which the fitting is coupled.

11. The connector of claim 6, wherein the exit aperture is circular and the groove has a coaxial inner diameter only sufficiently larger than the aperture diameter to assure isolation of the groove from the aperture.

12. A method of forming a fiber optic terminal, comprising
    forming an end fitting having a planar terminal face, a through bore in the fitting terminating in an exit aperture in the terminal face, and a reservoir groove in the terminal face surrounding the exit aperture and isolated therefrom,
    inserting the fiber through the bore and beyond the terminal face, and
    melting the fiber and forming it coplanarly with the terminal face, with the excess reflowed fiber material received within the groove completely below the terminal face.

13. A fitting for the end of a light-transmitting fiber comprising a body, a cavity in the body for receiving a fiber, a planar terminal face formed on the end of the body and containing an exit aperture for the fiber, and a reservoir groove formed in the terminal face surrounding the exit aperture for receiving the excess reflowed material resulting from melting of the fiber to form a smooth end surface, the groove being spaced from the exit aperture by a portion of the terminal face.

14. The fitting of claim 13, wherein the groove is dimensioned to completely receive subsurface the excess reflowed fiber material.

15. The fitting of claim 14, wherein the groove is spaced from the exit aperture only sufficiently to assure isolation therefrom.

16. The fitting of claim 15, wherein the groove is circular and coaxial with the exit aperture.

17. The fitting of claim 16, wherein the body has an annular chamfer adjacent the groove about the periphery of the terminal face to enhance alignment of the fiber with a device to which the fitting is coupled.

* * * * *